United States Patent [19]

King

[11] Patent Number: 4,655,172

[45] Date of Patent: Apr. 7, 1987

[54] TRAINING HARNESS FOR CATS

[76] Inventor: Shannon C. King, 7745 Romaine, #9, West Hollywood, Calif. 90046

[21] Appl. No.: 727,095

[22] Filed: Apr. 25, 1985

[51] Int. Cl.[4] .............................................. A01K 27/00
[52] U.S. Cl. ...................................... 119/96; 119/29; 54/71
[58] Field of Search .................. 119/96, 106, 109, 29, 119/126; 54/71

[56] References Cited

U.S. PATENT DOCUMENTS

| D. 230,036 | 1/1974 | Francis | 119/109 |
|---|---|---|---|
| 477,644 | 6/1892 | Chambers | 54/71 |
| 1,614,083 | 1/1927 | Plantico | 119/96 |
| 2,826,172 | 3/1958 | Buckle et al. | 119/96 |
| 3,310,034 | 3/1967 | Dishart | 119/106 |

FOREIGN PATENT DOCUMENTS 57298 11/1890 Fed. Rep. of Germany .......... 54/71

Primary Examiner—Gene Mancene
Assistant Examiner—David I. Tarnoff
Attorney, Agent, or Firm—Roger A. Marrs

[57] ABSTRACT

A harness is disclosed herein for training a cat to walk which includes an elongated back or base strap for fixedly carrying a buckled neck strap and a buckled chest strap for encircling the cat in front of and behind the forelegs of the cat. A walking strap is detachably connected to the back strap at one end and incorporating a handle loop at its other end for controlling direction of the cat. Forward urging and control of the cat is achieved by an endless looping strap trained under the tail of the cat and extending along its opposite sides through guide loops carried on the chest strap and being extended along with the direction control strap to cooperatively forceably urge the cat into a desired direction.

1 Claim, 2 Drawing Figures

TRAINING HARNESS FOR CATS

BACKGROUND OF THE INVENTION

1. Field of the Invention

The present invention relates to animal training devices and, more particularly, to a novel training harness for small animals such as a cat which will aid in the training of walking by including means for forceably urging the animal in a desired direction.

2. Brief Description of the Prior Art

It is well known that some animals such as cats for example are difficult to train and, in particular, difficult to train the cat to walk adjacent to its owner. Although harnesses have been provided for small animals which strap about the forelegs, chest and neck of the animal, difficulties stem from the fact that some animals have a tendency to sit and refuse to walk. Also, these animals generally when on their four legs refuse to go in a desired direction requiring that the owner drag or pull the harnessed animal across the terrain. Hopefully, the animal learns that it is easier to walk in the direction of pull rather than to be dragged in such a manner.

Obviously, such training procedure is crude, awkward and generally is not effective for gaining the owner's desired end. Therefore, a long standing need has existed to provide a small animal harness which will readily urge the animal to go in a forward direction and which will indicate to the animal in which direction the owner desires the animal to go. Such means should be comfortable for the animal to wear and should not chafe or otherwise injure or mar the animal during use.

SUMMARY OF THE INVENTION

Accordingly, the above problems and difficulties are obviated by the present invention which provides a novel animal harness for controlling the animal which includes an elongated back strap having a buckled neck strap and chest strap downwardly depending from opposite ends of the back strap. The back strap further secures a releasable fastener carried on one end of a direction control strap that terminates in its opposite end in a loop intended to be carried in one hand by the user. Additionally, an endless strap is carried on opposite sides of the chest strap by slidable arrangement through a pair of loops so that a first portion of the strap can be positioned beneath the tail of the animal while a second portion of the strap extends upwardly substantially in parallel with the direction control strap. The latter strap constititues a means held by the user for forceably urging the animal in a forward direction.

Therefore, it is among the primary objects of the present invention to provide a novel training harness for a small animal which will not only direct the animal into a suitable direction when walking but will forceably urge the animal into that selected direction.

Another object of the present invention is to provide a novel harness having a directional control strap as well as a strap for forceably urging the animal in a forward direction wherein the harness may be readily detachably connected about the neck and chest of the animal as well as about its posterior.

Still another object of the present invention is to provide a novel training harness for small animals such as cats which are reluctant to be trained to walk which incorporates control means in the form of a pair of straps to be held by the hands of the user so that the animal may be selectively encouraged to travel in a particular direction and to be forceably urged in that direction.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Referring to.

DESCRIPTION OF THE PREFERRED EMBODIMENT

Figure 1:
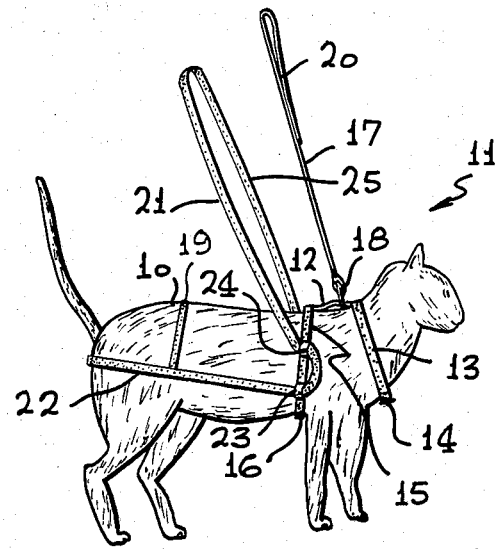
FIG. 1, the novel animal training device of the present invention is illustrated in a typical application in connection with the training of an animal such as a cat.

Referring to FIG. 1, an animal is shown by the number 10 which in the present description will be identified as a cat. Generally, a cat is extremely reluctant to take commands from its owner so that training the cat to walk adjacent to the owner is extremely difficult. The training harness of the present invention is useful in the training of the animal and is indicated in the general direction of arrow 11. The harness 11 includes an elongated back strap 12 having a neck strap 13 fixedly attached to one end of the back strap 12 and which includes a buckle 14 for connecting together of opposite ends for adjustment purposes about the neck of the animal. A chest strap 15 is fixedly secured to the other end of the back strap 12 from its end attached to the neck strap 13 and the chest strap is carried about the upper waist of the animal and includes a buckle 16 releasably connecting the opposite ends of the strap for adjustment purposes. It is to be understood that other forms of attachment may be used than buckles such as Velcro fasteners, hook and pile fasteners or the like. An elongated control strap 17 is detachably connected at one end to the back strap by a releasable fastener 18 while the opposite end of the strap includes a loop 20 intended to be carried by one hand of the user. As described, the strap 17 may be used to control the direction in which the user intends the animal to travel. By urging the strap to either the right or left of the animal's body, signals the animal that it is the owner's intention to move in that selected direction.

However, to forceably urge the animal to go into that particular direction, an endless strap 21 is employed which constitutes a first portion 22 that is placed underneath the tail of the animal and extends forward on opposite sides of the animal to slidably pass through a pair of loops 23 and 24 so as to upwardly extend in a second portion indicated by numeral 25. By tugging on the strap or loop 21, the animal is forceably urged to move in a forward direction and by slightly lifting on the strap urges the animal into an upright position for readily walking.

Figure 2:
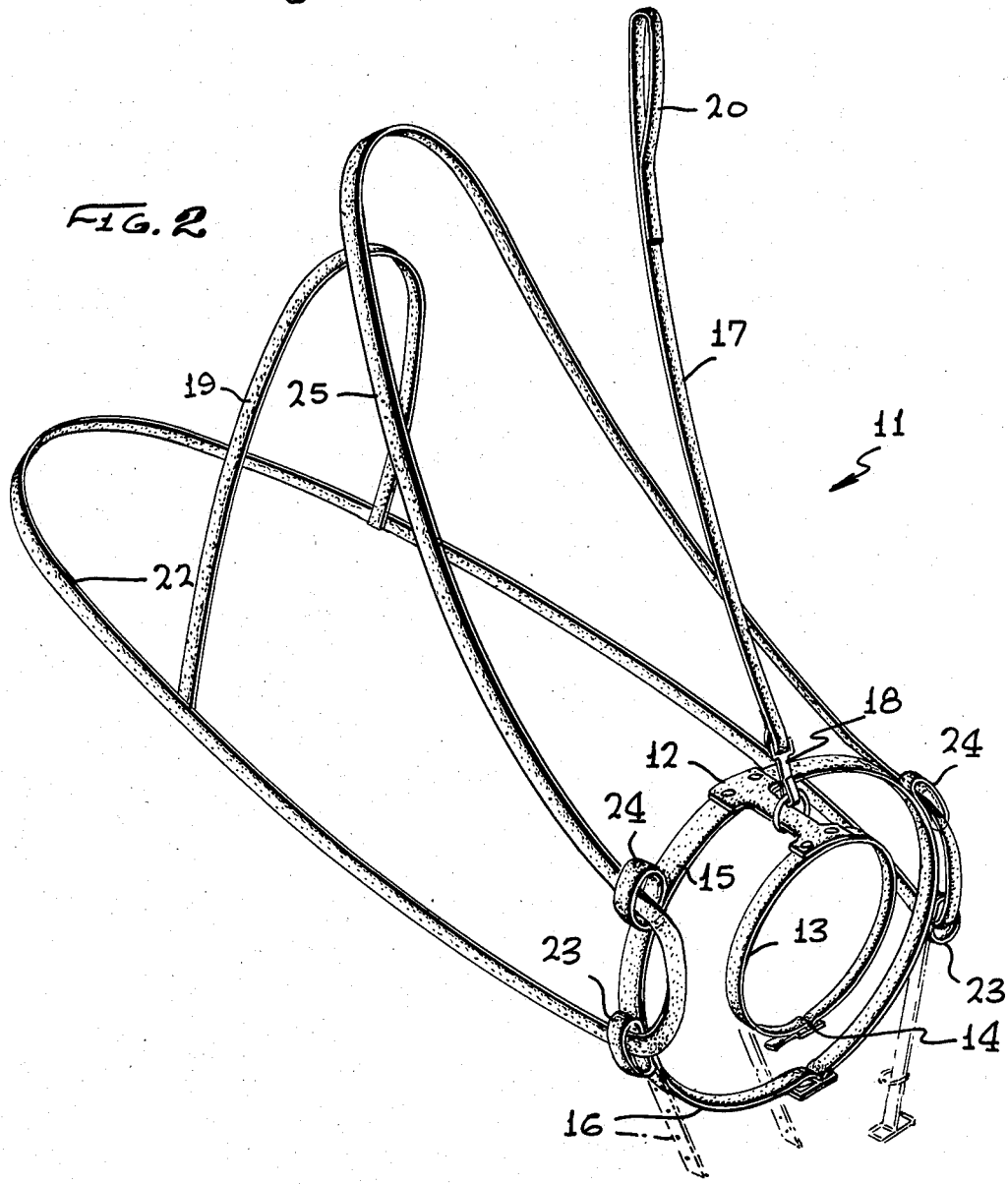
FIG. 2 is an enlarged perspective view showing the novel training harness of the present invention as used in FIG. 1.

Referring now in detail to FIG. 2, it can be seen that the guide loops 23 and 24 are repeated on the opposite side of the strap 15 so that the back strap 12 separates the pair of guide loops. Also, it can be seen that as the loop portion 22 of the strap 21 passes through the lower guide loops 23, the strap is reversed upwardly and rearwardly to extend through the upper guide loops 24. In order to make the harness completely adjustable for a variety of sized animals, the guide loops 23 and 24 may be placed in position on the strap 15 by means of a hook and pile fastener. However, it is to be understood that fixed fasteners such as rivets or the like may be used. The loop portions 22 and 25 are readily slidable with respect to the harness chest strap 15 and, in this manner, the length of the animal from its front haunches to the tail may be adjusted.

In actual use, the back strap 12 is placed immediately behind the head of the animal while the chest strap 15 is placed around the waist of the animal and buckled or fastened together for securement. The neck strap 13 is then placed about the neck immediately in front of the legs of the animal and loosely fastened into position by the buckle 14. The first loop 22 of the strap 21 is elongated by sliding the strap 21 through guide loops 23 and 24 so that the reverse portion of the strap forming the loop 22 is immediately beneath the tail of the animal. At this time, the strap 21 may be pulled slightly through the guide loops 23 and 24 so that the first loop portion 22 is cinched into position. The user, preferably, will place the loop 20 in one hand while the loop 25 of the strap 21 will be carried in the other hand of the user. By manipulating both control straps, the animal is forcibly urged to move in an upright position into a desired direction. In actual practice, the animal has been comfortably taught to walk or "heel" adjacent to its owner without injury or trauma to the animal. Lateral back strap 19 rests on the back of the animal and supports the harness so it does not drop or fall about the animal's rear legs.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A small animal training harness urging an animal to walk in a forward direction during a training procedure comprising the combination of:
    a chest harness having an elongated back or body strap terminating at its opposite ends with a chest strap and a neck strap respectively, said chest strap and said neck strap being joined together solely by said back or body strap;
    said chest strap adapted to encircle the chest of the animal immediately behind the forelegs and said neck strap adapted to encircle the neck of the animal immediately ahead of the forelegs;
    a leash detachably connected to a midsection of said back or body strap midway between its opposite ends for controlling direction of the animal;
    an endless control strap trained about the rear of the animal and slidably guided on said chest strap to extend substantially parallel to said leash for forceably urging the animal forward during the training procedure;
    said endless control strap includes a body loop portion extended about the opposite sides of the body of the animal from its rear to said chest strap and a handle loop extending in a reverse upward direction from said chest strap to terminate in a hand grip end in spaced relationship to said leash;
    guide means slidably carrying said control strap on opposite sides of said chest strap comprising a pair of spaced apart retainers on opposite sides of said chest strap separated by said back or body strap movably holding said control strap on said chest harness;
    each of said chest and neck straps includes a closure means for detachably coupling the opposite ends of said respective straps so as to constitute an adjustment means; and
    said leash and said endless control strap are held in the hands of a trainer in spaced apart parallel relationship wherein manipulation of said leash applies a load force about the neck of the animal forward of its legs to lead the animal in a preselected forward direction and independent manipulation of said endless control strap applies a load force to the hind end of the animal beneath its tail to forceably urge the animal forward under tension in said preselected direction.

* * * * *